(12) United States Patent
Roehling

(10) Patent No.: US 7,731,004 B2
(45) Date of Patent: Jun. 8, 2010

(54) BRAKE LINING WITH DAMPER PLATE

(75) Inventor: Willmut Roehling, Ruppichteroth (DE)

(73) Assignee: TMD Friction GmbH, Leverkusen (DE)

( * ) Notice: Subject to any disclaimer, the term of this patent is extended or adjusted under 35 U.S.C. 154(b) by 0 days.

(21) Appl. No.: 11/577,277

(22) PCT Filed: Oct. 18, 2005

(86) PCT No.: PCT/EP2005/011204

§ 371 (c)(1), (2), (4) Date: Dec. 26, 2007

(87) PCT Pub. No.: WO2006/045496

PCT Pub. Date: May 4, 2006

(65) Prior Publication Data

US 2008/0257665 A1      Oct. 23, 2008

(30) Foreign Application Priority Data

Oct. 21, 2004    (DE) .................. 10 2004 051 269

(51) Int. Cl.
*F16D 65/092*    (2006.01)
(52) U.S. Cl. ................. 188/250 B; 188/250 G
(58) Field of Classification Search ........... 188/250 B, 188/250 G, 251 M
See application file for complete search history.

(56) References Cited

U.S. PATENT DOCUMENTS

| | | | |
|---|---|---|---|
| 3,477,551 A | 11/1969 | Beuchle et al. | |
| 4,846,312 A | 7/1989 | Sweetmore et al. | |
| 5,358,684 A * | 10/1994 | Valentin ............... | 419/10 |
| 5,538,104 A | 7/1996 | Katz et al. | |
| 5,816,370 A | 10/1998 | Verbeeten et al. | |
| 5,842,546 A * | 12/1998 | Biswas .................. | 188/73.37 |
| 6,349,803 B2 | 2/2002 | Brosilow | |
| 2004/0003972 A1* | 1/2004 | Kurz et al. ............. | 188/250 E |
| 2004/0099493 A1* | 5/2004 | Himmelsbach et al. . | 188/250 B |
| 2004/0238297 A1* | 12/2004 | Brecht et al. .......... | 188/73.37 |

FOREIGN PATENT DOCUMENTS

| | | |
|---|---|---|
| DE | 4021093 A1 | 1/1992 |
| DE | 4104812 | 8/1992 |
| DE | 19542524 A1 | 5/1997 |
| DE | 19842193 | 3/2000 |

(Continued)

*Primary Examiner*—Christopher P Schwartz
(74) *Attorney, Agent, or Firm*—Connolly Bove Lodge & Hutz LLP

(57) ABSTRACT

The invention relates to a brake lining (1) comprising a lining support plate (2) which is provided with a friction lining (7) arranged on the surface thereof. A damper plate (3) is placed on the opposite to the friction lining (7) second face of the lining support plate (2). Said damper plate (3) comprises integrated anchoring elements (4) for preventing lateral sliding thereof, wherein said anchoring elements (4) pass through a recess embodied in the lining support plate (2) and are engaged with the friction lining (7). Damping layer (6) on which a brake piston can act during braking is disposed on the damper plate (3) opposite to the lining support plate (2). An adhesive layer (8) is applied between the damper plate (3) and the lining support plate (2) in such a way that the damper plate (3) is fixable to the lining support plate (2).

14 Claims, 1 Drawing Sheet

FOREIGN PATENT DOCUMENTS

| | | |
|---|---|---|
| EP | 0282129 A1 | 9/1988 |
| EP | 0373333 | 6/1990 |
| EP | 0636807 A1 | 2/1995 |
| JP | 58-207535 | 12/1983 |
| JP | 58207535 | 12/1983 |
| WO | WO-96/15386 | 5/1996 |

* cited by examiner

US 7,731,004 B2

BRAKE LINING WITH DAMPER PLATE

RELATED APPLICATIONS

This application is a national stage application (under 35 U.S.C. 371) of PCT/EP2005/011204 filed Oct. 18, 2005, which claims the benefit of German application 10 2004 051 269.8 filed Oct. 21, 2004.

BACKGROUND OF THE INVENTION

The invention relates to a brake lining with a lining backplate, with a friction lining arranged on a first side of the lining backplate, with a damping plate or damper plate that is arranged on a second side of the lining backplate facing away from the friction lining and with means to secure the damping plate against lateral slipping.

A brake lining of the above-mentioned type is disclosed in WO 96/115386. A damping plate uncouples vibrations of a brake piston, which acts on the brake lining, from the lining backplate. An adhesive layer, for instance, a cold-bonding or hot-bonding polymer layer, is applied onto the bottom of the damping plate and serves to attach the damping plate to the lining backplate as well as to improve the damping properties. On the piston side, a layer of rubber, plastic or paint is arranged on the damping plate, forming a damping layer between the piston and the brake lining. This prevents direct metal-on-metal contact between the brake piston and the lining backplate, thus achieving an uncoupling of the vibrations that occur during the braking procedure.

Multilayered lining backplates are also known from the state of the art. German patent application DE 195 42 524 A1 discloses such a brake lining, whereby the lining material is attached to several of the layers of the lining carrier.

European patent application EP 0 282 129 A1 describes a brake lining having a one-piece backplate in which sections of a damping plate extend into recesses in the backplate and prevent the damping plate from slipping.

U.S. Pat. No. 3,477,551 A discloses a brake lining in which shaped protuberances on the backplate extend into the lining material.

In the production of brake linings, it is indispensable for the friction lining to be firmly connected to the lining backplate. Moreover, it must be ensured that the damping plate is firmly connected to the lining backplate and that it can transfer the braking force as required. Since at elevated braking temperatures, the adhesive layer between the damping plate and the lining backplate provides less adhesion with respect to the shear forces that occur, the prior-art brake linings are provided with additional means to secure the damping plate against lateral slipping. For this purpose, through holes with counter-sunk bores are formed in the lining backplate. Countersunk screws inserted into these holes secure the damping plate against shear forces and lateral slipping.

The object of the invention is to improve and simplify the attachment between the damping plate and the friction lining.

SUMMARY OF THE INVENTION

In order to achieve this object, with the above-mentioned brake lining, it is provided that at least one anchoring element is shaped onto the damping plate, said anchoring element passing through a cutout located in the lining backplate and penetrating into a section in the friction lining.

The brake lining according to the invention is characterized by a very simple configuration of the means for securing the damping plate against lateral slip-ping. The at least one anchoring element, which is shaped onto the damping plate, ensures a torsion-resistant connection between the damping plate and the friction lining and is capable of absorbing the shear forces that occur during operation without any problem. The fact that the damping plate and anchoring elements are shaped in one piece simplifies the production of the securing means as well as the assembly and attachment of the damping plate. The latter is inserted, together with the at least one anchoring element that is bent downwards from the plane of the plate, through the appertaining cutout into the lining backplate and the free end section of the lining backplate is inserted into the friction lining.

A particularly firm connection between the friction lining, the damping plate and the lining backplate that lies between them is obtained in a refinement of the invention in that the section of the anchoring element that penetrates into the friction lining is configured in such a way that it is anchored in the friction lining with a positive fit. Such a positive fit can be attained, for example, in that the section of the anchoring element that penetrates into the friction lining is configured so as to be S-shaped, zigzag-shaped or helical.

The cohesion between the damping plate, the lining backplate and the friction lining can be further improved in a refinement of the invention in that a plurality of anchoring elements are arranged on the damping plate so as to be distributed around a pressure-absorption area. In this context, preferably every single anchoring element is associated with a cutout of its own in the back-plate, so that the distribution pattern between the plurality of anchoring elements and the corresponding number of cutouts in the lining backplate essentially match. The number and arrangement of the cutouts in the lining backplate should be selected in such a way that the mechanical stability of the brake lining is not impaired to any considerable extent.

The damping plate is preferably connected to a lining backplate by an adhesive layer or else attached using other attachment means. However, it is also possible to connect the damping plate to the friction lining exclusively by means of the anchoring elements that penetrate into the friction lining with a positive fit. The anchoring elements that penetrate into the friction lining create a three-dimensional, sturdy connection between the friction lining, the lining backplate and the damping plate.

The anchoring elements can already be embedded into the friction lining material before the friction lining material has been pressed and hardened, the elements being anchored by means of a subsequent pressing and hardening procedure. In this process, the damping plate is glued with adhesive onto the adjacent side of the lining backplate, whereby the anchoring elements pass through the cutouts in the lining backplate. A friction lining mold is filled with a layer of friction compound and a layer of backing compound, after which the lining backplate is pressed with the friction-lining material via a mirror plate that is laid thereupon. In this process, the anchoring elements dig into the friction lining compound and are tightly surrounded as more pressure is applied onto the friction lining compound. Subsequently, an elastomer layer can be arranged on the reverse side of the damping plate.

Preferably, the anchoring element is shaped out of the damping plate by stamping and/or bending. In this case, the damping plate is especially easy to manufacture and, if desired, this can be performed in one single production step. For example, tongues can be stamped out of the damping plate which are then bent downwards from the plane of the damping plate to one side, so that they protrude approximately perpendicularly out of the plane of the damping plate. It is likewise possible to create notches and/or stamped cuts in the edge areas of the damping plate in order to bend and shape the tongues that have been formed in this manner.

Preferably, the friction lining arranged on the lining backplate is made up of a sequence of layers of the backing compound and friction compound. The anchoring elements of the damping plate pass through the hacking compound and penetrate with their free ends into the friction compound layer.

Advantageous embodiments of the invention are characterized in the subordinate claims.

DETAILED DESCRIPTION

Figure 1:
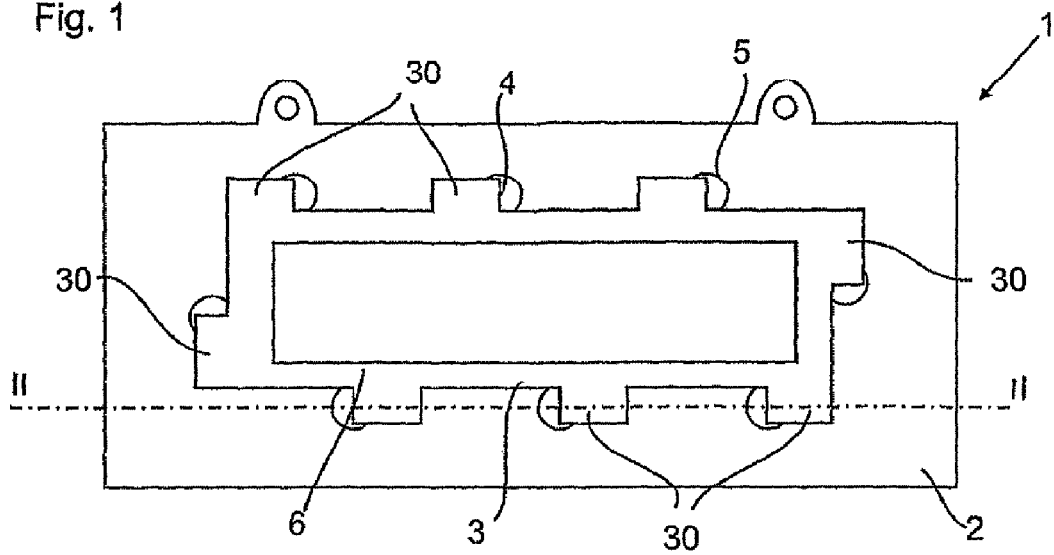
FIG. 1 schematically shows an embodiment of a brake lining according to the invention in a top view of its damping plate side.
Figure 2:
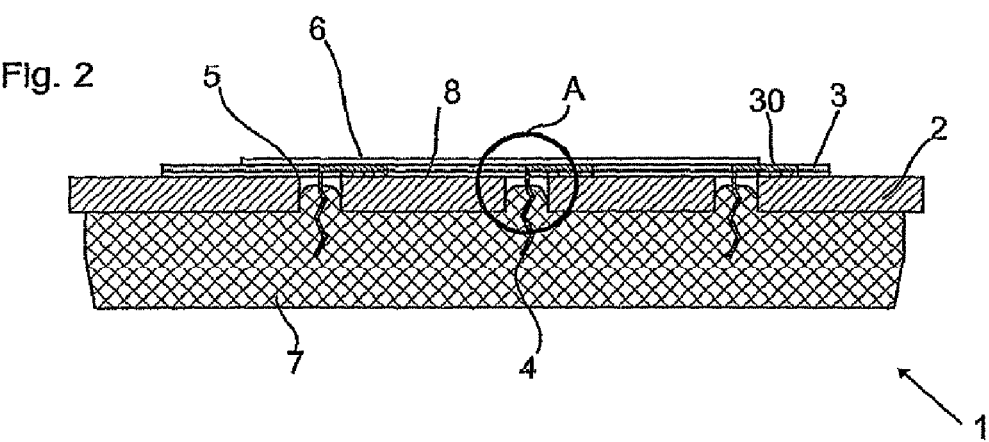
FIG. 2 shows a schematic sectional view along line II-II of FIG. 1.
Figure 3:
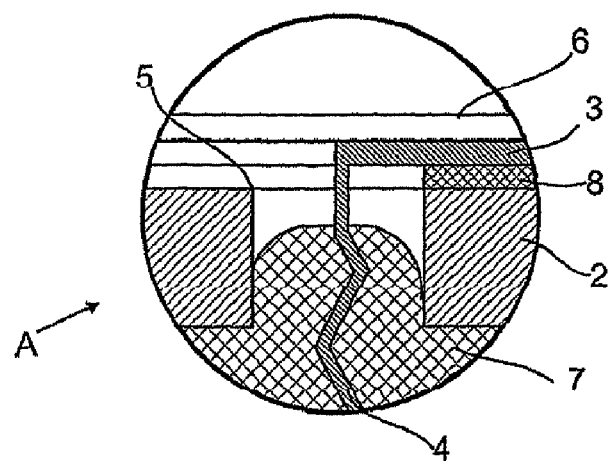
FIG. 3 shows an enlarged depiction of section A of FIG. 2.

The brake lining 1 has a lining backplate 2 on one side of which a damping plate 3 is arranged over a large surface area and connected to the lining backplate 2. The damping plate 3 has laterally shaped-on extensions 30 from which anchoring elements 4 in the shape of strips on one side are bent downwards. The layout and configuration of the strip-shaped anchoring elements according to the embodiment described can be best seen in FIGS. 2 and 3. In the described embodiment, the anchoring elements are stamped at regular intervals out of the edge area of an originally rectangular sheet metal blank, whereby an essentially rectangular connection remains at the transition site between the anchoring element 4 and the extension 30. The stamped-out free ends of the anchoring elements are each bent in a zigzag shape (FIGS. 2 and 3). Instead of the zigzag shape of the free ends of the anchoring elements 4, other anchoring shapes can also be provided such as, for instance, anchoring elements with wavy or helical configurations or else a forked splaying of the free end of each anchoring element.

The anchoring elements 4 can also be made of other sheet metal blanks; for example, the anchoring elements can be shaped with radiating extensions facing outwards by bending and forming an anchoring section onto each of which ends are shaped. The extensions can also be rendered helical by being twisted.

The lining backplate 2 has through openings 5 through which the anchoring elements 4 pass. Consequently, the opening grid is aligned with the grid of the anchoring elements 4 so that the bent anchoring elements 4 can be easily inserted into the through openings 5 when the damping plate 3 is put in place.

A damping layer 6 is arranged on the side of the damping plate 3 facing away from the lining backplate 2. This damping layer, which can consist, for instance, of an elastomer, prevents direct metal-on-metal contact between the lining backplate 2 and a brake piston (not shown in the drawing), thus uncoupling the brake lining 1 from the vibrations of the brake piston.

The friction lining 7 is applied by pressing on the side of the lining backplate 2 facing away from the damping plate 6 [sic]. Here, the friction lining compound is pressed very far into the openings 5 of the lining backplate 2. As can be seen in FIG. 2, the anchoring elements 4, after passing through their appertaining through openings 5, dig into the friction lining compound and ensure a positive, practically undetectable connection between the damping plate 3 and the friction lining 7, thereby enclosing the lining backplate that lies between them. The positive fit is achieved by the zigzag shape of the free ends of the anchoring elements 4. Other shapes as well as splaying of the individual anchoring elements 4 fulfill the same function.

The flat main part of the damping plate 3 and the lining backplate 2 are connected to each other by an adhesive layer 8; in the embodiment described, this adhesive layer 8 consists of a hot-bonding adhesive. The adhesive bond 8 between the damping plate 3 and the lining backplate 2 essentially fills up all of the interstices between the two plates that are connected to each other. This largely eliminates air gaps between the damping plate and the lining backplate, something which could give rise to detrimental vibrations.

Numerous modifications are possible within the scope of the inventive idea. For instance, the number and configuration of the anchoring elements shaped onto the damping plate can vary as a function of the application case and dimensions of the lining backplate; the anchoring elements can also be manufactured separately and then connected to the damping plate in a single soldering or welding step. The friction lining material can have several layers and can consist of an underlayer and a friction compound layer sequence.

The invention claimed is:

1. A brake lining, comprising:
a lining backplate,
a friction lining arranged on a first side of the lining backplate,
a damping plate that is arranged on a second side of the lining backplate facing away from the friction lining side, and a plurality of anchoring elements shaped out of the damping plate by being bent downwards from the plane of the plate and each having a free end, said anchoring elements defining a length terminating at the free end and defining an axis along said length, each anchoring element passing through an appertaining cutout in the lining backplate and their free end penetrating into the friction lining, wherein each anchoring element along its length forms at least one bend in a direction away from the axis so that said free end is anchored in the friction lining with a positive fit to secure the damping plate against lateral slipping and against relative movement with respect to the friction lining in the direction of the axis.

2. The brake lining according to claim 1, wherein the anchoring elements are shaped out of the damping plate by punching, stamping and/or bending.

3. The brake lining according to claim 1, wherein the section of each anchoring element that penetrates into the friction lining is configured so as to be S-shaped, zigzag-shaped or helical.

4. The brake lining according to claim 1, wherein a plurality of anchoring elements are arranged on the damping plate so as to be distributed around a pressure-absorption area.

5. The brake lining according to claim 1, wherein the damping plate is glued to the lining backplate.

6. The brake lining according to claim 1, wherein the friction lining is affixed to the lining backplate.

7. The brake lining according to claim 1, wherein the friction lining has a sequence of layers of a backing compound and a friction compound, and in that each anchoring element at least penetrates into the backing compound.

8. The brake lining according claim 7, wherein at least one anchoring element passes through the backing compound and penetrates into the friction compound.

9. The brake lining according to claim 1, wherein the damping plate has a thickness of about 0.5 mm to about 3 mm.

10. A brake lining, comprising:
- a lining backplate having a first side and a second side and defining two or more through openings;
- a friction lining adjacent to the first side of the lining backplate;
- a damping plate adhered to the second side of the lining backplate; and
- two or more anchoring elements shaped of portions of the damping plate and extending downwards from the plane of the damping plate, each anchoring element having a length terminating at a free end and defining an axis along said length, wherein each anchoring element along its length forms at least one bend in a direction away from the axis, said anchoring elements each passing through an appertaining opening in the lining backplate so that the free ends dig into the friction lining and a portion of the length and the free ends interlock with the friction lining.

11. The brake lining of claim 10, wherein the free end of each anchoring element that digs into the friction lining is configured so as to be S-shaped, zigzag-shaped or helical.

12. The brake lining of claim 10, wherein the anchoring elements are shaped out of the damping plate by being bent downwards from the plane of the plate.

13. The brake lining of claim 10, wherein the friction lining has a sequence of layers of a backing compound and a friction compound, and in that the free end of each anchoring element at least penetrates into the friction compound.

14. The brake lining of claim 10, wherein the damping plate is secured against relative movement with respect to the friction lining in the direction of the axis.

* * * * *